G. W. RUNDLE.
PROPULSION MECHANISM.
APPLICATION FILED NOV. 8, 1916.
1,226,014.
Patented May 15, 1917.
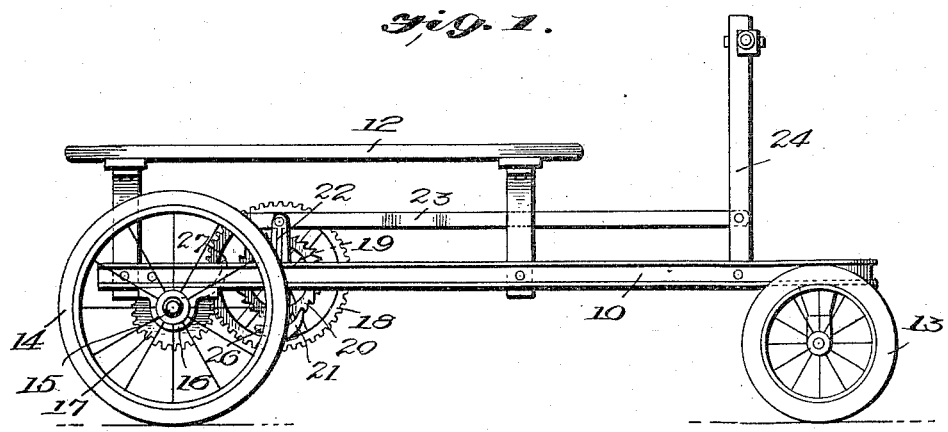
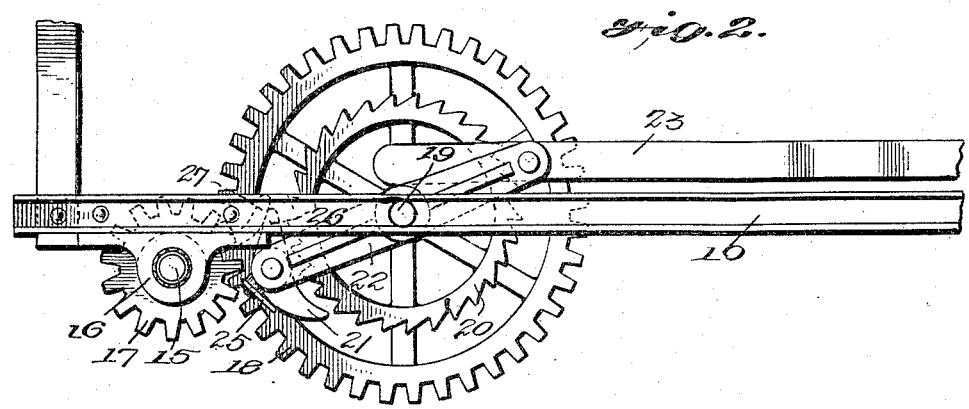
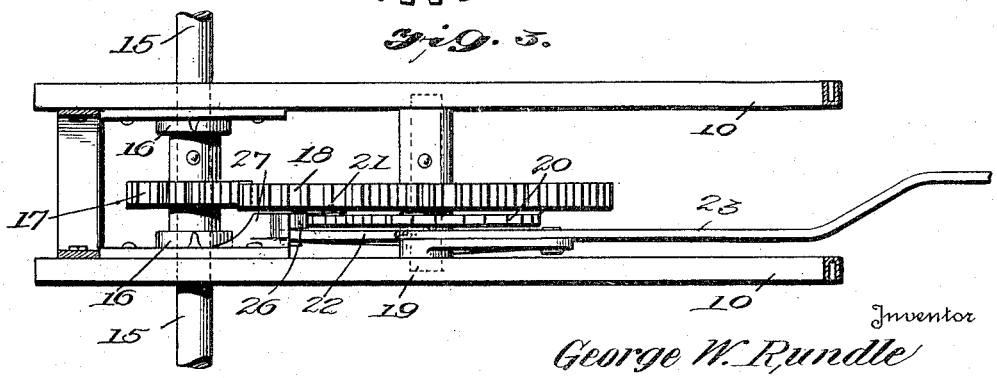
Inventor
George W. Rundle
By Max A. Schmidt
Attorney

UNITED STATES PATENT OFFICE.

GEORGE W. RUNDLE, OF COLUMBUS, OHIO.

PROPULSION MECHANISM.

1,226,014.  Specification of Letters Patent.  Patented May 15, 1917.

Application filed November 8, 1916. Serial No. 130,174.

*To all whom it may concern:*

Be it known that I, GEORGE W. RUNDLE, a citizen of the United States, residing at Columbus, in the county of Franklin and State of Ohio, have invented certain new and useful Improvements in Propulsion Mechanisms, of which the following is a specification.

This invention relates to manually propelled vehicles for children's use, and its object is to provide a novel and improved pawl-and-ratchet driving or propulsion mechanism operated by a hand lever, said mechanism being so constructed and arranged that the pawl may be thrown into inoperative position to allow the vehicle to coast, and, furthermore, to provide a pawl-and-ratchet mechanism which has no dead-center position, and which makes a maximum stroke possible.

The objects stated are attained by means of a combination and arrangement of parts to be hereinafter described and claimed, and in order that the same may be better understood, reference is had to the accompanying drawing forming a part of this specification.

In the drawing, Figure 1 is a side elevation of a children's vehicle showing the application of the invention; Fig. 2 is an enlarged side elevation of the mechanism for propelling the vehicle, and Fig. 3 is a plan view of said mechanism.

Referring specifically to the drawing, the body of the vehicle illustrated comprises two parallel, spaced side bars 10 carrying a seat 12. The running gear of the vehicle comprises front steering wheels 13 and hind driving wheels 14, the latter being supported on an axle 15 supported by bearing brackets 16 carried by the side bars 10.

The following means are provided for propelling the vehicle:

On the drive axle 15 is fixed a pinion 17 which is in mesh with a spur gear 18 mounted on a shaft 19 extending between and supported by the side bars 10. Alongside the gear 18, and fixed thereto, or formed integral therewith, is a ratchet ring 20 engageable by a pawl 21 carried at one end of a lever 22 having connected to its other end a longitudinal drive link 23 extending transversely of the lever. The lever 22 is fulcrumed intermediate its ends on the shaft 19, and the forward end of the link is connected to a hand lever 24 fulcrumed to the side bars 10.

It will be evident from the foregoing, that when the lever 24 is swung back and forth, the lever 22 is oscillated, and through the pawl 21 and the ratchet ring 20, the gear 18 is rotated, said gear transmitting motion to the drive axle 15 through the pinion 17.

A spring 25 carried by the lever 22, and bearing on the pawl 21, holds the latter yieldingly in working engagement with the teeth of the ratchet ring 20.

The pawl 21 is pivoted intermediate its ends to the lever 22, and it has a projecting tail 26 which is in the path of an abutment 27 on one of the bearing brackets 16. The pawl 21 and the drive link 23 are on opposite sides of the axis of the ratchet ring 20, and the abutment 27 is so located that it intercepts the pawl before the lever and the drive link come into longitudinal alinement, or in a dead-center position. It will therefore be seen that the parts cannot get to a dead center position, as the rearward swing of the lever is stopped by the engagement of the pawl with the abutment before the lever comes into longitudinal alinement with the drive link. When the pawl strikes the abutment, it is also tripped off the ratchet ring, which leaves the latter free to rotate backward when the vehicle is backed, and as the drive axle now also runs free, the vehicle may be allowed to coast. The pawl can be held free of the ratchet ring as long as desired by holding the hand lever 24 pushed forward. In the ordinary running of the vehicle, the hand lever is swung back and forth just far enough to operate the pawl-and-ratchet mechanism. If the forward stroke of the hand lever should be too far, a dead-center position will not be obtained, as the abutment stops the lever 22 before it comes into longitudinal alinement with the drive link 23. If the operator wishes to coast or to back, it is necessary only to push the hand lever forward until the abutment trips the pawl off the ratchet ring. The working stroke of the lever 22 is slightly less than one half the circumference of the ratchet ring, and in view of the long stroke obtained, the vehicle is easy to propel. The structure is also simple and inexpensive, and it is therefore well adapted for the type of vehicle to which it is applied.

The drive link 23 has a rearward extension, and the hub of the lever 22 extends transversely thereof. Thus, when the link is at the limit of its forward stroke, it rests on the hub of the lever, as shown in Fig. 2. This also occurs when the link is at the limit of its rearward movement. The hub of the lever therefore serves as an abutment, and the link is stopped thereby before it can assume a dead-center position with respect to the lever, the stop occurring on both strokes of the link.

The preferred embodiment of the invention has been disclosed, but it will be understood that various changes may be made in the structural details, without a departure from the spirit and scope of the invention. Thus, a pawl-and-ratchet mechanism may be placed on both sides of the gear 18.

I claim:

1. A propulsion mechanism for vehicles, comprising a driving axle, a rotatable driving member operatively connected to said axle, a ratchet fixed to said member, a pivoted pawl engaging the ratchet, a lever carrying the pawl at one end, actuating means connected to the other end of the lever, and an abutment in the path of the pawl located to intercept the same to disengage it from the ratchet.

2. A propulsion mechanism for vehicles, comprising a driving axle, a rotatable driving member operatively connected to said axle, a ratchet fixed to said member, a pivoted pawl engaging the ratchet, a lever carrying the pawl at one end, a longitudinal drive link connected to the other end of the lever and extending transversely thereof, and an abutment in the path of the pawl to intercept the same at the end of the stroke of the lever in one direction to disengage the pawl from the ratchet, said abutment being located to intercept the pawl prior to the relative movement of the lever and the link into a dead-center position.

3. A propulsion mechanism for vehicles, comprising a driving axle, a rotatable driving member operatively connected to said axle, a ratchet fixed to said member, a pivoted pawl engaging the ratchet, a lever carrying the pawl at one end, a longitudinal drive link connected to the other end of the lever and extending transversely thereof, and a stop for limiting the stroke of the lever in one direction, said stop being located to stop the lever prior to the relative movement of the lever and the link into a dead-center position.

4. A propulsion mechanism for vehicles, comprising a pawl-and-ratchet device, a lever carrying the pawl at one end, a drive link connected to the other end of the lever, and an abutment intercepting the link at the limit of its strokes in opposite directions.

5. A propulsion mechanism for vehicles, comprising a pawl-and-ratchet device, a lever carrying the pawl at one end, a drive link connected to the other end of the lever, and an abutment extending transversely of the link and intercepting the latter prior to its dead-center position with respect to the lever.

In testimony whereof I affix my signature in the presence of two witnesses.

GEORGE W. RUNDLE.

Witnesses:
 NEAL D. CARTER,
 GAIL YENRICK.

Copies of this patent may be obtained for five cents each, by addressing the "Commissioner of Patents, Washington, D. C."